April 16, 1974  K. R. M. HOGSTEDT ET AL  3,804,964
METHOD AND APPARATUS FOR TREATING FISH
Filed June 2, 1971  2 Sheets-Sheet 2
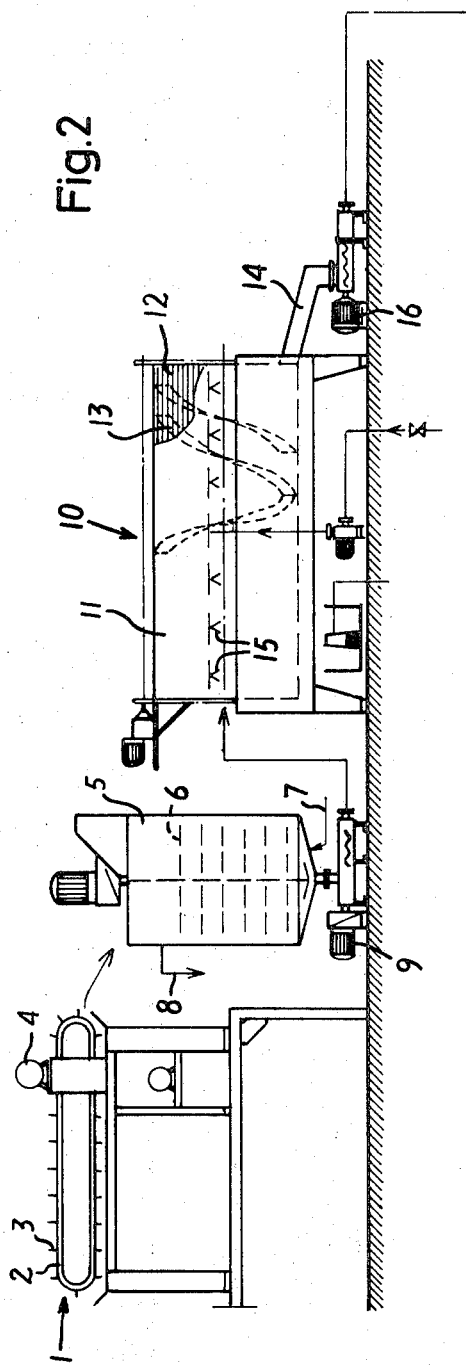
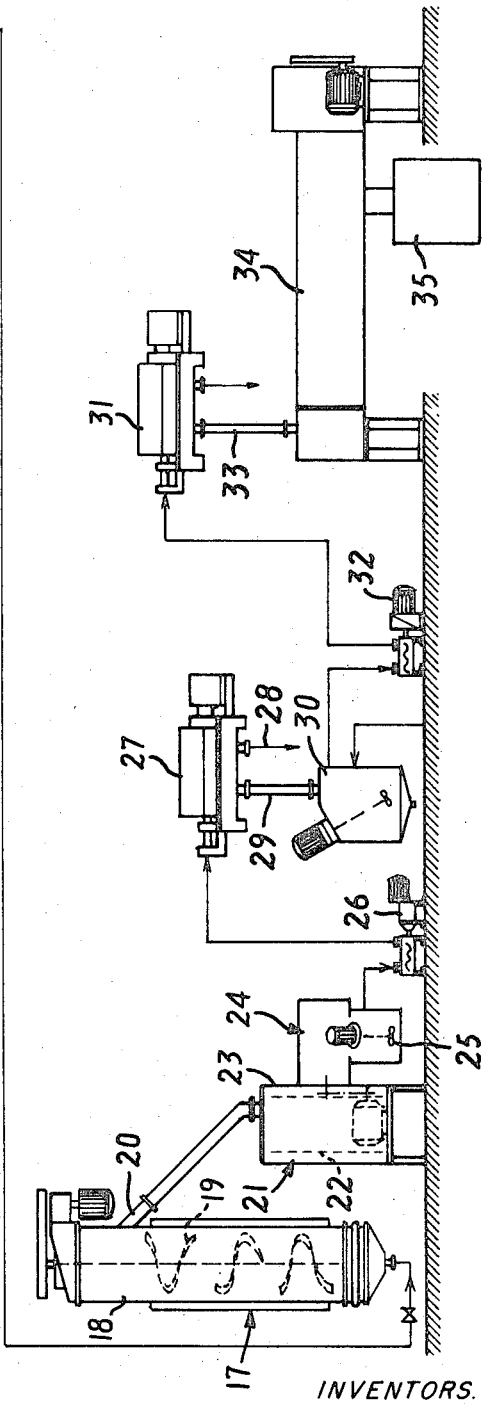
Fig.2
INVENTORS.
KLAS RAGNAR MAGNUS HOGSTEDT,
TRYGGVE LUND KNUTSEN,
ERIK TORSTEN LENNART SVENSSON &
SVEN-OLOF OSTERMAN
BY Brumbaugh, Graves,
Donohue & Raymond
their ATTORNEYS 3,804,964
METHOD AND APPARATUS FOR TREATING FISH
Klas Ragnar Magnus Hogstedt, Vastra Frolunda, Tryggve Lund Knutsen, Asa Station, Erik Torsten Lennart Svensson, Goteborg, and Sven-Olof Osterman, Molndal, Sweden, assignors to Aktiebolaget Astra Nutrition, Molndal, Sweden
Claims priority, application Sweden, June 4, 1970, 7,789/70
Int. Cl. A22c 25/16; A23l 1/325
U.S. Cl. 426—473                                6 Claims

ABSTRACT OF THE DISCLOSURE

Fish can be treated to produce a high protein material having substantially reduced taste, odor, and fat content by cutting individual fish into pieces, washing the fish pieces by contacting them with a countercurrent of water, then spraying them with water, and coagulating the pieces with a concurrent steam flow while passing them through a direct-steam boiler. Bones and other nonfibrous hard pieces are separated from the coagulated material which is then homogenized and centrifuged to remove fat, soluble substances, and skin fragments. Preferably the steps of homogenizing and centrifuging are repeated, and the material is then pressed and dried.

BACKGROUND OF THE INVENTION

This invention relates to a new and highly efficient method and apparatus for the treatment of fish to yield a high protein material having substantially reduced taste, odor, and fat content.

It has long been recognized that fish constitute a potential source of high protein material which has many potential uses, particularly as an ingredient in the preparation of nutritionally valuable foods for humans and animals. It is important that the high protein material extracted from the fish be substantially taste and odor free and that the fat content be greatly reduced. It is also desirable that it have a light yellow or yellow-white color to prevent discoloration of the final product in which it is used.

Known processes for reducing the taste, odor, and fat content of fish possess a number of important disadvantages such as high cost, contamination of the final product by chemical agents by which it is treated, and ineffectiveness in altering the properties of the material. It is common to use bleaching agents to lighten the color of the material, but bleaching agents are known to have a destructive influence on the sensitive fish protein.

SUMMARY OF THE INVENTION

This invention comprises a new and highly effective method and apparatus for treating fish to produce a high protein material having substantially reduced taste, odor, and fat content. The fish is first cut into pieces by a slicing means including a plurality of rotating blades which cut the individual fish along lines perpendicular to their longitudinal axes. The fish pieces are then advanced to a tank where they are washed in a counter-current flow of water. Next, the pieces are moved to a rotating drum on which they are held while they are sprayed with water emitted by nozzles disposed along the rotational axis of the drum. The pieces then pass through a direct-steam boiler in which coagulation takes place. Bones and other non-fibrous hard pieces are removed in a separator, and the fish is then homogenized, after which it is transported to a centrifuge. Fat, soluble substances, and skin fragments are removed by centrifuging, and water is then removed from the fish by pressing and drying. The homogenizing and centrifuging steps may be repeated in a second homogenizer and second centrifuge before the final product is moved to the presser and the dryer.

BRIEF DESCRIPTION OF THE DRAWINGS

An understanding of additional aspects of the invention can be gained from a consideration of the following detailed description of a representative embodiment of the invention taken in conjunction with the appended drawings wherein:

FIG. 2 is a pictorial diagram of an apparatus for treating fish constructed in accordance with the invention.

DESCRIPTION OF THE PREFERRED EMBODIMENT

Figure 1:
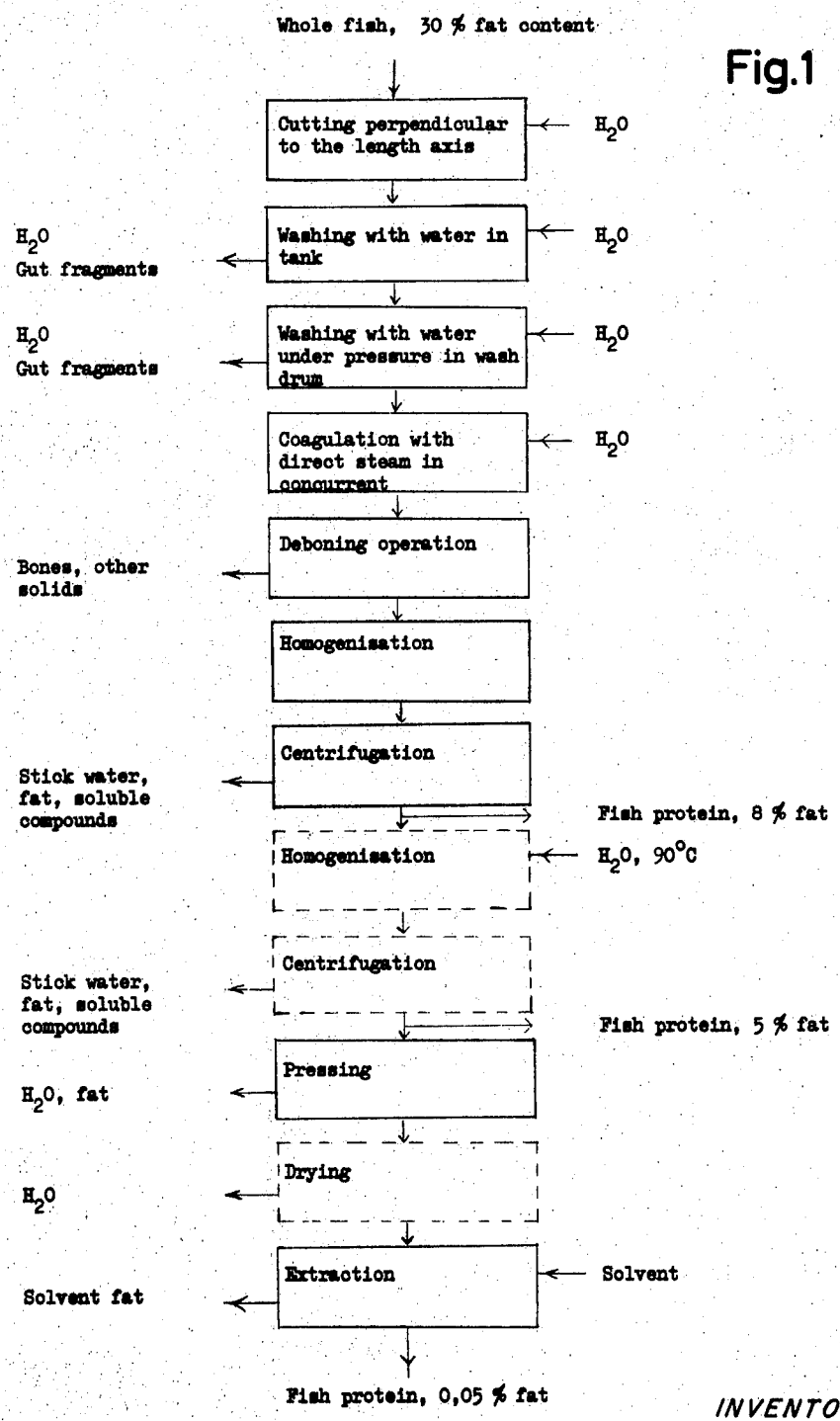
FIG. 1 is a flow-chart showing the steps of the method of the invention arranged in the appropriate order.

Fresh fish to be processed is brought from a fishing boat to a raw material silo at a processing plant. Preferably, this is recently caught fresh fish, and it is stored in a suitable aqueous environment such as a mixture of 80 percent fish and 20 percent water.

Next the fish are moved from the raw material silo to an elevator tank where the transporting water is removed, and the fish is then transported by a stepless, variable-speed elevator to a slicing means 1 shown in FIG. 2. At the slicing means 1, the fish are cut into pieces in accordance with the first step shown on the flow-chart of FIG. 1.

The slicing means 1 includes a conveyor belt 2 across which are mounted a series of parallel carriers 3 that function as guide means for positioning and holding the fish perpendicular to the direction of motion of the belt 2. The guide means also includes a group of guide bars (not shown) obliquely positioned above the belt 2 which push the fish into their proper position against the carriers 3. The fish are moved by the belt 2 and associated carriers 3 past a plurality of rotating circular knives 4 which pass through slots in the carriers 3 and cut the fish into pieces along lines perpendicular to their longitudinal axes (the longitudinal axis of a fish being a line connecting the head and tail). As the fish is cut, the blood rich regions are laid bare, and blood is carried away by a water spray.

From the conveyor belt 2 the fish pieces move to a diffusion tank 5 which functions as a first means for washing the fish pieces. Here the pieces are contacted with a countercurrent of water, the ratio of water to fish in the tank 5 being at least one-to-one. A plurality of stirrers 6 are disposed within the tank 5 to constantly agitate the fish pieces and mix them with the water. The tank 5 is also provided with an air inlet 7 that emits a constant stream of air to the lower portion of the tank 5. The motion of the stirrers 6 plus the constant air stream moving through the tank increases the contact between the fish in the water and provides desired diffusion at the bottom of the tank 5.

While the fish pieces are in the tank 5, blood, gut fragments, and fat deposits are removed via a spillway 8. The fish pieces should be retained in the tank 5 long enough to soak out most of the blood but not long enough to damage the protein. The optimum time of retention varies from approximately 15 to 120 minutes. A typical optimum time is about 60 minutes.

After countercurrent washing in the tank 5, the fish pieces are pumped, with a quantity of transporting water equal to about 50 percent by weight of the mixture, by a first pump 9 to a second washing means 10. The primary purpose of the second washing step is to separate the viscera from the fish pieces. The second washing means 10 comprises a rotatable drum 11 which is provided with a plurality of closely spaced open slots 12 extending longitudinally along its surface. A plurality of guide bars 13 are disposed about the surface of the drum 11, each guide bar 13 forming an open helix. The guide bars 13 feed the fish pieces toward an outlet 14 as the drum 11 rotates. As the pieces move toward the outlet 14, they are sprayed by water emitted from a plurality of nozzles 15 positioned along the rotational axis of the drum 11. By the time the pieces reach the outlet 14 approximately 95 percent of the original viscera and blood content has been removed by the water spray. The water carrying this waste product passes out through the slots 7 and is discharged.

The water used in the first wash means 5 and the second wash means 10 may be either fresh water (tap water) or saline water. If saline water is used, fresh water should be supplied to the nozzles 15 which are closest to the outlet 14 to reduce the salt content of the fish pieces, and thus the ash residue of the final product.

The pieces emerging at the outlet 14 are mixed with fresh water, and moved by a second pump 16 to the bottom of a direct-steam boiler 17 where coagulation takes place. Fresh transporting water should be present in an amount equal to between approximately 0.5 and 1.0 times the weight of the fish pieces. When the pieces enter the boiler 17, this transporting water facilitates efficient heat transfer from the steam to the fish.

The direct-steam boiler 17 includes a vertically disposed steam-jacketed cylinder 18 and a plurality of stirrers 19 that form an open, broken helix. The stirrers 19 are disposed within the cylinder 18 and are arranged to rotate about its vertical axis. In the boiler 17, concurrent flow is utilized, i.e., the fish pieces are introduced at the bottom of the cylinder 18 along with the steam and both flow upwardly together. The quantity of steam is equal to about 20 to 30 percent by weight of the fish and it is injected along the bottom of the cylinder 18. This causes immediate denaturation of the surface of the fish pieces, and, in this way, a fixation of the melanin pigment of the fish skin is obtained. The boiler 17 includes thermostatic control means that varies the amount of direct steam introduced so that the final temperature is about 92 to 95° C. The temperature of the fish is raised gradually as the pieces move upwardly through the cylinder 18, and completely coagulated fish material is withdrawn from the boiler 17 through a spillway 20.

The fish material flows from the spillway 20 to a deboning separator means 21 in which most of the remaining bones, fins, scales, gills, eyes, and gut fragments are separated. The separator 21 includes a rotating element 22 which carries slightly inclined rotor blades that force the relatively soft fish material through perforations in the surface of the drum 23 that surrounds the rotating element 22. The harder undesirable parts of the fish are retained within the drum 23 and disposed of. Seventy percent of the bone content of the fish material is removed by the separator 21 which results in a commensurate reduction in the ash content of the final product. The fluorine content is also greatly reduced in the separator 21.

The fish material flows directly from the separator 21 to a first homogenizing means 24 in which the coagulated fish material is disintegrated by a rotating stirrer 25 of the Ultratrurrax type. This disintegration causes the melanin pigment to be released. The fish material remains in the homogenizer 24 for a period of about 1 to 2 minutes during which the stirrer 25 rotates at a speed of about 2700 r.p.m., and the energy thus dissipated is equal to about 550 kgm. per kilogram of fresh fish processed. The ratio of water to dry substance in the homogenizer 24 is about 5 to 1. This water derives mostly from that added immediately before the fish pieces are transported to the boiler 17 and from the condensation of the steam within the boiler 17. Part of the water in the homogenizer 24 is attributable to the natural water content of the fresh fish.

The fish material is moved from the first homogenizer 24 to a first centrifuge 27 by a third pump 26. The released melanin pigment is then removed from the fish material along with an aqueous phase containing stick water and fat. After centrifuging, the fish material has a dry substance content equal to about 33 percent by weight and it has a pronounced fibrous structure. Skin fragments which are are disintegrated by the homogenizing step are not retained with the more fibrous fish material. Fat and water soluble compounds in the form of proteins and salt are also removed by the centrifuging process after disintegration in the homogenizer 24 and are discharged through an outlet 28 as part of an aqueous phase. The removed portion also includes most of the odor producing compounds such as trimethyl amine.

The fish material from the first centrifuge 27 is discharged through an outlet 29. It is preferable to homogenizer 30 in which water, at a temperature of approximately 90° C., is added in an amount equal to about 82 percent by weight of the total water-fish material mixture. The second homogenizer 30 is similar in construction to the first homogenizer 24.

The fish material is transported from the second homogenizer 30 to a second centrifuge 31 by a fourth pump 32. In the second centrifuge 31 additional melanin pigment, fat, water soluble compounds, and water are removed. The fish material is then transported to a press 34 in which additional water is removed. From the press 34 the material moves to a dryer 35 from which emerges as a finished product suitable for use as a substantially fat free, tasteless, and odorless protein material of light color which can be used as an ingredient in foodstuffs for human or animal consumption. Although it is preferable to include the second homogenizing and centrifuging steps as set forth above, these steps and the corresponding apparatus may be omitted. A final product taken from the outlet 29 of the first centrifuge 27 and fed to the press 34 is not of the same quality as the final product obtained by the preferred process. It does, however, compare favorably with products obtained by previously known processes.

The fish material that has been treated by a process including the use of the second centrifuge 31 contains only a very small quantity of water soluble compounds such as trimethyl amine and other odor producing compounds and has a low fat content. When fish having an original fat content of 39 percent by weight of the dry substance content is treated, the output of the second centrifuge 31 typically has a fat content equal to only 5 percent based on the weight of the dry substance. If the second homogenizer 30 and the second centrifuge 31 are omitted the fat content is approximately 8 percent. A fat content of 5 or 8 percent compares favorably to a fat content of 12 percent which is present when the same fresh fish is disintegrated, boiled, freed of bones, and pressed. The fat contents given above were determined by a chloroform-methyl extraction.

The quantity of water soluble compounds present in the final product of the preferred process described above is equal to 3.5 percent by weight of the dry substance content when the second homogenizer 30 and the second centrifuge 31 are used. When these two steps are omitted, the water soluble compound content rises to 4.07 percent. In a final product prepared by conventional methods without any centrifuging or homogenizing and having a 12 percent fat content the water soluble compound content varies from 3 to 7 percent.

An examination was made of material taken from the second washing means 11 and from the separator 21. Seven hundred and ninety one pieces having a total weight of 4.702 kg. were removed. It was found that there were 761 clean pieces having a total weight of 4.457 kg. There were 30 impure pieces containing gut fragments which had a total weight of 245 g. Thus, 3.8 percent of the pieces contained gut fragments and these pieces made up 5.2 percent of the total weight. There were 6.4 pieces per kilogram of fish containing gut fragments. The bone content of the pieces removed weighed 191 g. and contained 90 pieces of gut fragment weighing 4 g. Assuming that the bone content represents 2.5 percent by weight of the fish material, 191 g. of bone is equivalent to 7.640 kg. of fish. Ninety pieces of gut fragment per 7.640 kg. of fish, corresponds to 11.8 gut fragments per kilogram of fish material.

The method and apparatus of this invention yields a high protein fish product which is particularly suitable for use as a starting material in the preparation of high protein, nutritious food products. The final product can be used immediately as a feed stuff or food ingredient or it can be dried and stored. In the latter case, it must, of course, be protected against oxidation. The fat content and the trimethyl amine content are greatly reduced. The color is lightened by the removal of the melanin pigment. Small traces of elements such as iron and copper are substantially washed out, thereby inhibiting oxidation which is catalyzed by the presence of these elements. Iron is normally present in fish in about 100 p.p.m., mainly in the form of myoglobine. The quantity of pure, raw, digestible protein present is considerably higher in a product prepared according to this method as compared to a product yielded by previously known methods. It is of considerable importance that the fat content is reduced by 50 to 75 percent. Ash residue is reduced about 50 percent.

The preferred embodiment described above is meant to be merely exemplary, and it is susceptible of modification and variation without departing from the spirit and scope of the invention. The invention is, therefore, not deemed to be limited except as defined by the appended claims.

We claim:

1. A method of treating fish to produce a high protein material having substantially reduced taste, odor, fat content, and color comprising:
   cutting individual fish into pieces along lines perpendicular to their longitudinal axes;
   washing the fish pieces by first contacting them with a countercurrent flow of water and then spraying them with water;
   coagulating the fish pieces with a concurrent steam flow while passing them through a direct-steam boiler;
   separating bones and other nonfibrous hard pieces from the remainder of the fish material;
   homogenizing the remainder of the fish material for a period of time sufficient to cause release of the melanin pigment;
   centrifuging the material whereby fat, soluble substances, and skin fragments are removed;
   homogenizing the remainder of the fish material a second time;
   centrifuging the material a second time whereby additional fat, soluble substances, and skin fragments are removed;
   pressing the fish material to remove part of the water content; and then
   drying the remaining fish material.

2. An apparatus for treating fish to produce a high protein material having substantially reduced taste, odor, fat content, and color comprising a slicing means for cutting individual fish into pieces sufficiently perpendicular to the longitudinal axes of said individual fish to promote removal of viscera and blood, a means for washing said sliced fish pieces with water, said washing means comprising a tank in which the fish pieces are contacted by a counterflow of water and a rotating drum having a plurality of nozzles disposed along its rotational axis from which water is sprayed onto the pieces as they are held on the drum, a direct steam boiler means for coagulating said washed fish pieces with a concurrent steam flow, a separating means for removing bones and other nonfibrous hard pieces from the remainder of said coagulated fish pieces, a means for homogenizing said remainder of the fish pieces, means for centrifuging said homogenized fish pieces whereby fat, soluble substances, and skin fragments are removed, and a drying means for reducing the water content of said centrifuged fish pieces.

3. The apparatus of claim 2 in which a plurality of closely spaced longitudinal slots are formed in said drum and at least one guide bar having the shape of an open helix is disposed along the surface of the drum to guide the fish along the drum as it rotates.

4. The apparatus of claim 2 wherein said slicing means comprises a plurality of rotatable circular knives, a conveyor belt for carrying the fish under the knives, and a plurality of carriers positioned on the belt for holding the fish while they are cut, the carriers being slotted to receive the rotating knives.

5. The apparatus of claim 2 further comprising a plurality of pumping means arranged to transport a mixture of the material being processed and transporting water between successive parts of the apparatus.

6. The apparatus of claim 2 further comprising a second homogenizer arranged to receive the fish material from the first recited centrifuge and a second centrifuge arranged to receive the fish material from the second homogenizer.

References Cited

UNITED STATES PATENTS

| 1,421,283 | 6/1922 | Meakia | 99—7 |
| 3,114,638 | 12/1963 | Huhn et al. | 99—7 |
| 1,909,643 | 5/1933 | Waugh | 146—98 |

FOREIGN PATENTS

| 878,055 | 9/1961 | Great Britain | 17—65 |

RAYMOND N. JONES, Primary Examiner

U.S. Cl. X.R.

17—56; 426—148, 479

UNITED STATES PATENT OFFICE
CERTIFICATE OF CORRECTION

Patent No. 3,804,964     Dated April 16, 1974

Inventor(s) K. R. M. Hogstedt et al.

It is certified that error appears in the above-identified patent and that said Letters Patent are hereby corrected as shown below:

Col. 4, line 5, delete second "are";

Col. 4, line 15, "nize this product again in a second homoge", insert at end of this line.

Col. 4, line 71, "245 g" should read -- 245 kg --;

Col. 4, last line, "191 g." should read -- 191 kg --;

Col. 5, line 1, "4 g" should read -- 4 kg --;

Col. 5, line 3, "191 g." should read -- 191 kg --.

Signed and sealed this 1st day of October 1974.

(SEAL)
Attest:

McCOY M. GIBSON JR.
Attesting Officer

C. MARSHALL DANN
Commissioner of Patent